United States Patent [19]

Kincaid et al.

[11] Patent Number: 4,756,964

[45] Date of Patent: Jul. 12, 1988

[54] BARRIER FILMS HAVING AN AMORPHOUS CARBON COATING AND METHODS OF MAKING

[75] Inventors: Pamela J. J. Kincaid; Virgil B. Kurfman, both of Midland, Mich.; Nick M. Sbrockey, Milwaukee, Wis.

[73] Assignee: The Dow Chemical Company, Midland, Mich.

[21] Appl. No.: 912,301

[22] Filed: Sep. 29, 1986

[51] Int. Cl.$^4$ .................. B32B 9/00; B32B 31/00; B65D 1/00; B05D 3/00

[52] U.S. Cl. ............................... 428/408; 428/215; 428/412; 428/523; 156/272.6; 427/40; 427/45.1; 427/249; 220/453; 220/457; 206/484.2; 206/524.2; 229/3.5 R; 383/113; 383/116

[58] Field of Search ........... 428/215, 408, 412, 523; 427/39, 40, 45.1, 249; 206/484, 484.2, 524.2; 156/272.6; 220/453, 455, 457, DIG. 14; 229/3.5 R; 383/113, 116

[56] References Cited

U.S. PATENT DOCUMENTS

| | | | |
|---|---|---|---|
| 3,420,679 | 1/1969 | Gifford et al. | 428/412 |
| 3,959,567 | 5/1976 | Bradley | 156/272.6 |
| 3,961,103 | 6/1976 | Aisenberg . | |
| 4,060,660 | 11/1977 | Carlson et al. . | |
| 4,105,818 | 8/1978 | Scholle | 428/500 X |
| 4,212,933 | 7/1980 | Markin et al. | 427/39 |
| 4,382,100 | 5/1983 | Holland | 427/38 |
| 4,394,400 | 7/1983 | Green et al. | 427/38 |
| 4,400,805 | 8/1983 | Corbett et al. | 427/38 |
| 4,402,993 | 9/1983 | Aisenberg et al. . | |
| 4,452,828 | 6/1984 | Namba et al. . | |
| 4,504,519 | 3/1985 | Zelez . | |
| 4,511,419 | 4/1985 | Kuhlmann et al. | 156/272.6 |
| 4,519,339 | 5/1985 | Izu et al. | 427/39 |
| 4,524,106 | 6/1985 | Flasck | 428/408 |
| 4,552,791 | 11/1985 | Hahn | 428/35 |
| 4,667,620 | 5/1987 | White | 427/40 X |

FOREIGN PATENT DOCUMENTS

| | | | |
|---|---|---|---|
| 23160 | 2/1985 | Japan | 206/524.1 |
| 197740 | 10/1985 | Japan | 156/272.6 |
| 1238961 | 11/1986 | Japan | 427/249 |

OTHER PUBLICATIONS

"What Are Today's Trends in Europe and Japan?", Packaging vol. 31, No. 2, Feb. 1986, pp. 72–73.
McGraw Hill Dictionary of Scientific and Technical Terms, 3rd Ed. p. 707.

*Primary Examiner*—John E. Kittle
*Assistant Examiner*—Susan S. Rucker
*Attorney, Agent, or Firm*—L. E. Hessenaur, Jr.

[57] ABSTRACT

A barrier film having excellent low oxygen permeability is provided and includes a flexible polymeric substrate having an adherent amorphous carbon coating. The coating is applied by generating a gas plasma from a hydrocarbon gas within a coating chamber such that ions in the gas plasma impinge upon the polymeric substrate. A barrier film having an ultra low oxygen permeability is produced by coating a second polymeric substrate over the amorphous carbon coating.

24 Claims, No Drawings

BARRIER FILMS HAVING AN AMORPHOUS CARBON COATING AND METHODS OF MAKING

BACKGROUND OF THE INVENTION

This invention relates to barrier films and methods of making the barrier films. More particularly, the invention relates to (1) barrier films comprised of a flexible polymeric substrate and an amorphous carbon coating and (2) methods of making the barrier films using a gas plasma coating technique.

Barrier films are well known and widely used. They are extensively used in packaging for protecting a food item from the deleterious effects of oxygen and water vapor. Barrier films are also used in other commercial and industrial applications where a low degree of permeability to some extent is needed. Such films are made of a variety of materials and composite materials. For example, single layers of aluminum foil and Saran (trademark of the Dow Chemcial Company) are two household barrier films which are economical and capable of acting as a barrier to the migration of oxygen or water vapor. Coated materials such as waxed paper are useful household barrier films which are economical and capable of providing a measure of low oxygen and water vapor permeability.

Carbonaceous materials have been suggested in the prior art as capable of providing a coating having properties making them desirable for certain applications. Amorphous carbon coatings, in particular have been reported to be hard, optically transparent, non-conductive to electricity, and resistant to acids and alkalis. They have been used for the coating of optical lenses and as protective films in abrasive applications. See for example, U.S. Pat. Nos. 4,060,660; 4,382,100; and 4,504,519. However, the use of such coatings have not been suggested for use in barrier films.

The above noted barrier film coated materials are made by a variety of techniques. The particular coating technique used is primarily based on the substrate and coating material and the type and degree of physical properties needed in the final product. That is, certain coating techniques are more capable of producing coatings which are free of surface defects which could affect the coating's appearance and physical properties.

While the known barrier films are acceptable, there is still a need for barrier films with even better physical properties and better economics of production. In particular, there is a need for a barrier film having a low oxygen permeability rate. Such a film would also be optically transparent for appearance purposes and have physical properties which would make it suitable as a packaging material.

SUMMARY OF THE INVENTION

There has now been discovered a method of producing barrier films having improved properties over known barrier films. The method of the present invention results in barrier films having the attributes of a flexible and durable substrate with an adherent coating which provides desired low oxygen permeability.

According to one aspect of the present invention, a method is provided for forming a barrier film which comprises the steps of (a) treating the surface of a flexible polymeric substrate with an inert gas plasma for a time sufficient to improve the surface's adhesive properties, and (b) generating a gas plasma from a hydrocarbon gas adjacent the polymeric substrate, with ions from the gas plasma from the hydrocarbon gas impinging upon the substrate's surface forming an adherent amorphous carbon coating. The resultant barrier film has excellent low oxygen and vapor permeability. Barrier films having even lower oxygen permeability are made by applying a second polymeric layer over the amorphous carbon coating. The barrier films of the present invention may find use as packaging materials for a wide variety products where low oxygen and vapor permeability are desired.

Accordingly, it is an object of the present invention to provide barrier films having low oxygen and vapor permeability and methods for their preparation. This and other objects and advantages of the invention will become apparent from the following detailed description and the appended claims.

DETAILED DESCRIPTION OF THE PREFERRED EMBODIMENTS

The barrier films of the present invention are made from flexible polymeric substrates and have amorphous carbon coatings adhering to one or more surfaces thereof. The films, together with their methods of preparation, are described in detail in the following paragraphs.

Polymeric substrates used in the practice of the present invention are preferably sufficiently thin so that the final barrier film will have the desired flexibility. The barrier film itself must be thin to have good flexibility. Accordingly, one desirable aspect of the present invention is that it provides a means of improving the adhesive qualities of the substrate without increasing its thickness by treatment of the surface of the substrate as described in further detail below to aid the coating material in attaining satisfactory adhesion to the substrate. Suitable substrates preferably have a thickness of less than about 0.5 millimeters, although somewhat thicker substrates may be utilized for situations where flexibility of the barrier film is not critical. For example, a three-dimensional polymeric container structure may be coated in accordance with the methods of the present invention to produce a container having low oxygen and vapor permeability. Most preferably, the flexible polymeric substrates used in the practice of the present invention range in thickness from about 0.01 millimeters to about 0.20 millimeters.

Examples of polymeric substrates that can be used herein include polycarbonates, polyethylenes, polypropylenes, polybutylenes, polystyrenes, polyurethanes, polyvinylchlorides, polyesters, polybutadienes, polyamides, polyimides, fluoroplastics such as polytetrafluorethylene and polyvinylidenefluoride, cellulosic resins such as cellulose proprionate, cellulose acetate and cellulose nitrate, acrylics and copolymers such as acrylonitrile-butadiene-styrene and other copolymers derived from any of the aforementioned polymers. Polycarbonate and polyethylene, and polypropylene are preferred substrates. Polycarbonate is highly preferred because of its physical properties and cost effectiveness.

In accordance with a preferred practice of the present invention, the flexible polymeric substrate is initially introduced into a coating chamber capable of plasma deposition. Coating chambers of this type are well known and commercially available such as an MRC model SEM-8620 radio frequency bias device. They comprise a chamber which is capable of receiving the substrate and capable of withstanding a vacuum. The chamber additionally includes a vacuum pump and means in communication with the coating chamber for evacuating it, an inlet tube with a valve for introducing a gas to the coating chamber under controlled conditions, and means for generating a plasma within the chamber.

It is important to this invention that the plasma be generated under controlled conditions so as to obtain the necessary carbonaceous coating properly deposited on and adhered to the polymeric substrate. For this purpose, there is used an electrode positioned within the coating chamber connected through capacitive means to one terminal of a power supply source and a second electrode connected to another terminal. Preferably, one electrode acts as a support plate for the polymeric substrate with the second electrode being an earthed base plate. By the proper application of voltage and time of coating, as more fully described below, an adherent amorphous carbon coating free of stress cracks and substantially free of pinholes is formed on the substrate.

In operation, the coating chamber is initially evacuated to a vacuum of less than about $1 \times 10^{-5}$ torr. Next, an inert gas such as argon is introduced into the chamber through the inlet tube until the pressure within the chamber reaches from about $1 \times 10^{-3}$ to about $1 \times 10^{-2}$ torr, and preferably about $7 \times 10^{-3}$ torr. A gas plasma is formed in the inert gas by applying a radio frequency power source to the electrodes. A power input of from about 50 watts to about 200 watts and a voltage bias of about negative $-100$ volts to about negative $-200$ volts is applied for about 1 to 10 minutes. Both the power input and voltage bias applied may vary somewhat depending upon the particular gas plasma deposition device used and its operating characteristics. What is important is that the device is capable of generating sufficient gas plasma to impinge upon the surface of the polymeric substrate.

The polymeric substrate to be coated typically rests on an electrode which is negatively biased relative to the plasma. It has been found that treating the polymeric substrate with the plasma generated by the inert gas under the stated conditions imparts improved adhesive properties to the substrate when it is subsequently coated. Achieving enhanced adhesion in this manner (as opposed to having to employ a separate adhesive material) is an important aspect of this invention in that it allows the final product to be thin and flexible. Preferably, a voltage bias of from about $-150$ volts to about $-180$ volts is used for from about 2 to about 5 minutes to obtain optimum adhesive properties when a polycarbonate substrate is utilized, although, as discussed above, these parameters may vary depending on the particular device used. Lesser times are required when a polyethylene substrate is utilized.

The gas flow is then switched from the inert gas to a hydrocarbon gas after the initial treatment period. Alternatively, the film may be moved to a different chamber to be exposed to the hydrocarbon gas. Examples of hydrocarbon gases useful in the practice of the present invention include alkanes such as methane, ethane, propane, n-butane, pentane, hexane, and cyclohexane. methylene chloride, alkylenes such as ethylene, acetylene, benzene and acetonitrile. Ethylene is a preferred hydrocarbon gas. A pressure of less than about $5-10^{-2}$ torr, preferably, from about $1 \times 10^{-2}$ torr to about $1 \times 10^{-1}$ torr, is maintained in the coating chamber. Connection of the power source to the electrodes so as to provide a power input of less than about 200 watts and bias voltage of less than about negative 250 volts produces a gas plasma in the coating chamber. Preferably, power input of from about 50 to about 200 watts and a bias voltage of from about negative 100 volts to about negative 250 volts are used. Use of high power inputs and/or bias voltages have been found to result in films having too much residual stress, which leads to poor adhesion and the formation of stress cracks.

It is theorized the hydrocarbon gas in the plasma is bombarded by electrons and is disassociated and ionized. During part of one half of the radio frequency cycle, the flexible polymeric substrate is in a region where the applied electric field attracts electrons. When the negative charge from the accumulated electrons results in a potential equal and opposite to that of the applied potential, positive ions are attracted to the negatively charged surface. When the positive ions impinge on the negatively charged surface, their charge is neutralized by the electrons, which are then replenished from the plasma during part of the next half cycle. Since the positive ions move slower than the electrons, the polymeric surface will have a net negative charge throughout the radio frequency cycle. If the positive ions are to have sufficient energy from the surface to be coated they must be accelerated towards the surface by the negative charge and the reversal of field at the surface must be sufficiently fast to keep the surface at a high net negative charge with respect to the plasma. Suitable frequencies to accomplish this range between about 0.5 megahertz to about 100 megahertz.

The length of the coating operation is continued until an amorphous carbonaceous coating is formed on the polymeric substrate. Preferably, the thickness of the coating ranges from about 200 angstroms to about 800 angstroms. Coatings of greater thickness are, of course, possible, but are not as desirable as they have been found to develop cracks which increase oxygen permeability through the coating. The resultant coatings are found to be hard, optically transparent, non-conducting and have excellent low oxygen permeability. The low oxygen permeability property of the coating makes the coated polymeric substrate especially useful as a barrier film. The oxygen permeability of the coated polymeric substrates of this invention is less than about 5.0 cubic centimeters of oxygen per 100 square inches film per day, per atmosphere, as measured by the dynamic gas chromatography method. The preferred coated polymeric substrates of this invention have oxygen permeability rates ranging from about 0.5 to about 2.0 cubic centimeters oxygen per 100 square inches film per day per atmosphere.

It is believed the excellent low oxygen permeability rates are due to the controlled conditions under which the amorphous carbon coating is formed. That is, the formed coating is relatively free of cracks and pinholes, compared to carbon coatings formed by other prior art coating techniques, e.g. vapor depositions and sputter depositions. The inert gas treatment step utilizing argon gas or the like is believed to clean the substrate and improve adhesion of the amorphous carbon to the substrate. The low power input and bias voltages are believed to be responsible for minimizing the amount of stress in the coating, thereby reducing the possibility for crack formation.

Barrier films with even lower oxygen permeability can be obtained by applying a second flexible polymeric substrate to the coated polymeric substrate described in the previous paragraphs. The second polymeric substrate can be made of the same material as found in the coated polymeric substrate or can be a different polymeric material. Preferably, the second polymeric substrate is a low permeability resin such as a Saran (trademark of Dow Chemical Company) resin. Use of such a resin not only protects the amorphous carbon coating during handling, but is also believed to fill in pinholes and/or cracks in that coating. Other flexible polymeric substrates listed above may also be used as the second polymeric substrate.

This second polymeric substrate has a thickness of less than about 0.5 millimeters, preferably a thickness ranging from about 0.01 millimeters to about 0.20 millimeters. It is believed the decreased oxygen permeability property of this three layer barrier film is due not only to the second polymeric substrate protecting the amorphous coating from physical alteration during handling, but also to the filling in of pinholes and/or cracks in the amorphous carbon coating with a resin which itself has low permeability characteristics.

The barrier films comprised of two flexible polymeric substrates with the amorphous carbon coating sandwiched between have oxygen permeability of less than about 0.1 cubic centimeters of oxygen per 100 square inches film per day per atmosphere. Preferably, the oxgen permeability rate ranges from about 0.001 to about 0.01 cubic centimeters of oxygen per 100 square inches film per day per atmosphere.

The second polymeric layer is applied to the amorphous carbon coated polymeric substrate by any convenient method. For example, it can be physically laid as a formed film of the second polymeric material, a solution or suspension of polymeric material sprayed or a solution or suspension of polymeric material roll coated onto the amorphous carbon coated polymeric substrate. All of the above coating techniques are well known, per se, in the art.

The amorphous carbon films produced by the practice of the present invention are electrically non-conductive and have been found to have optical absorption coefficients that range from about $2 \times 10^4$ cm$^{-1}$ for radiation with a 700 nanometer wavelength (near infrared) to about $1 \times 10^5$ cm$^{-1}$ for radiation with a 400 nanometer wavelength (near ultraviolet). The amorphous carbon films are stable under elevated temperatures. Exposure of barrier films of polycarbonate/amorphous carbon/polyvinylidene chloride to temperatures of 90° C. for 3 days or 121° C. for 1 hour did not adversely affect the oxygen permeability of the films.

Additionally, the barrier films of the present invention are superior to metallized films heretofore used in the art. Amorphous carbon coated polycarbonate, polyethylene, and polypropylene substrates have been found to have oxygen permeabilities which are one-third or less than those of the corresponding metallized substrates Moreover, the amorphous carbon is resistant to chemical attack and is compatible with polyvinylidene chloride.

In order that the invention may be more readily understood, reference is made to the following example, which is intended to illustrate the invention, but it is not to be taken as limiting the scope thereof.

EXAMPLE

An amorphous carbon coated polymeric substrate is prepared in accordance with the practice of the present invention as follows. A five inch square sheet of a polycarbonate substrate was placed in a radio-frequency bias sputter-etch system having a 13.56 megahertiz supply source. The substrate had a thickness of 0.1 millimeters. The substrate was position on a water-cooled metal plate capacitively coupled to the radio-frequency power supply. The coating chamber was first evacuated to a pressure of about $1 \times 10^{-5}$ torr. Argon gas was then admitted until a constant pressure of $7 \times 10^{-3}$ torr was obtained; the surface of the polycarbonate was treated with argon gas plasma for 3 minutes at a radio-frequency power input of 90 watts, which resulted in a potential bias of negative 100 volts.

The gas flow was then switched to ethylene and a gas plasma produced. An amorphous carbon film was deposited on the substrate from the ethylene gas plasma at $1 \times 10^{-2}$ torr gas pressure, 90 watts input power and negative 100 volts bias.

Another amorphous carbon coated substrate was made by the above procedure, except a low density polyethylene flexible substrate was used in place of the polycarbonate, and the substrate was treated with argon gas plasma for 1 minute instead of 3 minutes.

Barrier films having ultra low oxygen permeability rates were prepared by laying down a polyvinylidene chloride resin with a #6 Mayer wire wound rod to overcoat (0.54 mil wet film) the previously prepared amorphous carbon coated polymeric substrates. The resultant dried barrier films had 0.2 mil layers of polyvinylidene chloride.

The barrier films prepared above then tested against other films for comparison purposes. The oxygen permeability of the samples were measured using a dynamic gas chromatographic method as taught by T. L. Caskey, *Modern Plastics,* December, 1967. The results are reported below:

| Substrate | Oxygen Permeability (cc O$_2$/100 sq. in./day/atm) |
|---|---|
| Polycarbonate | 75 |
| Polyethylene | 340 |
| Polycarbonate/amorphous carbon | 0.5 |
| Polyethylene/amorphous carbon | 1.7 |
| Polycarbonate/amorphous carbon/ polyvinylidene chloride | <0.003 |
| Polyethylene/amorphous carbon/ polyvinylidene chloride | <0.01 |
| Polycarbonate/polyvinylidene chloride | 0.6 |
| Polyethylene/polyvinylidene chloride | 0.3–0.4 |
| Polyvinylidene chloride/ polycarbonate/amorphous carbon | 0.22 |

The above results show the polymeric substrates coated with amorphous carbon according to the process of the present invention have much lower oxygen permeability rates than the uncoated substrates. The results also show the decreased oxygen permeability achieved by the use of a polyvinylidene chloride layer over the amorphous carbon coated polymeric substrate as compared to (1) a polyvinylidene chloride/polymeric substrate composite film and (2) a film wherein the amorphous carbon is not protected on each side by the polymeric substrates.

What is claimed is:

1. A method of depositing an amorphous carbon coating on a flexible polymeric substrate to make a barrier film having excellent oxygen permeability, comprising the steps of:

(a) treating the surface of said polymeric substrate with an inert gas plasma for a time sufficient to improve the adhesive properties of said surface of said substrate: and (b) generating a gas plasma from a hydrocarbon gas adjacent said polymeric substrate, so that ions from said gas plasma from said hydrocarbon gas impinge upon said polymeric substrate to produce an inherent amorphous carbon coating thereon.

2. The method of claim 1 wherein the surface of said polymeric substrate is treated with said inert gas plasma for from about 1 to about 5 minutes.

3. The method of claim 2 wherein said inert gas plasma is argon.

4. The method of claim 1 wherein steps (a) and (b) are carried out in separate plasma position chambers.

5. The method of claim 4 wherein said flexible polymeric substrate comprises polycarbonate, polyethylene, or polypropylene.

6. The method of claim 5 wherein the flexible polymeric substrate is a polycarbonate.

7. The method of claim 5 wherein the hydrocarbon gas is ethylene, methane, propane, n-butane, or hexane.

8. The method of claim 7 wherein the hydrocarbon gas is ethylene.

9. The method of claim 7 wherein the thickness of the polymeric substrate ranges from about 0.01 millimeters to about 0.5 millimeters.

10. The method of claim 9 wherein the thickness of the polymeric substrate ranges from about 0.01 millimeters to about 0.20 millimeters.

11. The method of claim 10 wherein the thickness of the coating ranges from about 200 angstroms to about 800 angstroms.

12. The method of claim 1 including the step of coating a second polymeric material over said amorphous carbon coating.

13. The method of claim 1 wherein said amorphous carbon coating is optically transparent and non-conductive.

14. The method of claim 13 wherein the oxygen permeability of the coated polymeric substrate is less than about 5.0 cubic centimeters of oxygen per 100 square inches per day, per atmosphere.

15. A barrier film having low oxygen permeability, comprising:

(a) a flexible polymeric substrate; and (b) a coating of an amorphous carbon adhered to said polymeric substrate, said coating being produced by the impingement of gas plasma ions formed from a hydrocarbon gas.

16. The barrier film of claim 15 wherein the flexible polymeric substrate is formed from a polycarbonate, polyethylene or polypropylene.

17. The barrier film of claim 16 wherein the flexible polymeric substrate is polycarbonate.

18. The barrier film of claim 16 wherein the thickness of said polymeric substance ranges from about 0.01 millimeters to about 0.5 millimeters and the thickness of the coating ranges from about 200 angstroms to about 800 angstroms.

19. The barrier film of claim 15 wherein said coating is optically transparent and non-conductive.

20. The barrier film of claim 19 wherein the oxygen permeability of said film is less than about 5.0 cubic centimeters of oxygen per 100 square inches film per day, per atmosphere.

21. The barrier film of claim 15 further comprising a layer of a second flexible polymeric material adhered to said amorphous carbon coating for decreased oxygen permeability.

22. The barrier film of claim 21 wherein the thickness of said second layer of polymeric material ranges from about 0.01 millimeters to about 0.5 millimeters.

23. The barrier film of claim 21 wherein the oxygen permeability of said film is less than about 0.1 cubic centimeters of oxygen per 100 square inches film per day, per atmosphere.

24. The barrier of claim 23 wherein said flexible polymeric substrate comprises a polycarbonate material and said second layer of polymeric material comprises polyvinylidene chloride.

* * * * *